(12) United States Patent
Wilson

(10) Patent No.: US 7,789,611 B2
(45) Date of Patent: Sep. 7, 2010

(54) COMPACT SYSTEM FOR LIFTING AND MOVING A PRESSURIZED TANK

(75) Inventor: Michael Wilson, Winnsboro, TX (US)

(73) Assignee: Wilcole, Inc., Winnsboro, TX (US)

( * ) Notice: Subject to any disclaimer, the term of this patent is extended or adjusted under 35 U.S.C. 154(b) by 712 days.

(21) Appl. No.: 11/744,749

(22) Filed: May 4, 2007

(65) Prior Publication Data

US 2007/0292247 A1    Dec. 20, 2007

Related U.S. Application Data

(63) Continuation-in-part of application No. 11/424,184, filed on Jun. 14, 2006.

(51) Int. Cl.
*B65G 65/23* (2006.01)

(52) U.S. Cl. .................. 414/421; 414/331.06; 414/420; 414/444; 414/622; 280/47.15; 296/19

(58) Field of Classification Search .................. 414/420, 414/421, 444, 622, 331.06; 254/199, 250, 254/262; 280/47.15; 294/68.26; 296/19
See application file for complete search history.

(56) References Cited

U.S. PATENT DOCUMENTS

| | | | |
|---|---|---|---|
| 3,235,212 A * | 2/1966 | Baumiller, Jr. .............. 248/142 |
| 3,587,892 A * | 6/1971 | Vermette ..................... 414/420 |
| 4,021,070 A * | 5/1977 | Shea ............................ 296/19 |
| 4,395,188 A * | 7/1983 | Kaup .......................... 414/622 |
| 4,511,171 A * | 4/1985 | Petersen .................. 296/65.01 |
| 4,797,050 A * | 1/1989 | Habicht ...................... 414/420 |
| 5,207,550 A | 5/1993 | Lehman |
| 5,344,278 A | 9/1994 | Emig, Jr. |
| 5,393,190 A * | 2/1995 | Vickary ...................... 414/420 |
| 5,651,149 A * | 7/1997 | Garman ..................... 5/81.1 R |
| 5,658,118 A | 8/1997 | Luca |
| 6,637,999 B2 * | 10/2003 | Grossele ..................... 414/421 |
| 2002/0076313 A1 | 6/2002 | Vartanian, Sr. |

\* cited by examiner

*Primary Examiner*—Michael S Lowe
(74) *Attorney, Agent, or Firm*—Gardere Wynne Sewell LLP

(57) ABSTRACT

A hoist with a cradle for coupling with a pressurized tank. A linear actuator assembly raises the cradle above the floor surface. A base with casters allows a raised tank to be safely lifted and transported by a single operator. The cradle can be rotated and locked in a vertical or horizontal position for cylinder insertion and removal in EMS vehicles with either a vertical or a horizontal stowage compartment. When handling a horizontal cylinder stowage situation, an embodiment of the cradle features a retractable foot to allow the cylinder to be slid from the cradle into the compartment bottom first. Another embodiment has a fixed foot and allows the cylinder to be slid from the cradle into the compartment top first. Safety interlocks are provided to prevent rotation of the cradle if the foot is in the wrong position with respect to the horizontal orientation of the cradle.

11 Claims, 9 Drawing Sheets

COMPACT SYSTEM FOR LIFTING AND MOVING A PRESSURIZED TANK

CROSS-REFERENCES TO RELATED APPLICATIONS

This application is a continuation-in-part of prior application Ser. No. 11/424,184, filed Jun. 14, 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to an apparatus for lifting and moving pressurized tanks and more particularly relates to a compact apparatus for lifting and moving heavy pressurized oxygen tanks to assist in their installation in and removal from EMS response vehicles.

2. Description of Related Art

Pressurized oxygen cylinders are standard equipment onboard most ambulances and other EMS response vehicles. Most pressurized cylinders are constructed from aluminum or steel. Though lightest in weight, an empty aluminum pressurized oxygen cylinder can still weigh over one hundred pounds.

The Occupational Safety and Health Administration (OSHA) has no standard which sets limits on how much an employee may lift or carry. However, a sister agency, the National Institute for Occupational Safety and Health (NIOSH), has developed a mathematical model which helps predict the risk of injury based on the weight being lifted and accounts for many confounding factors. The model is based on previous medical research into the compressive forces needed to cause damage to bones and ligaments of the back.

NIOSH has shown through research that a lifting index greater than 3.0 can clearly be linked to an increased risk of back and other injuries. In applying the NIOSH equation for calculating a lifting index, an EMS worker or maintenance individual lifting a one hundred pound pressurized oxygen tank from the floor and stowing it in a compartment of an ambulance would likely encounter a lifting index of 3.9 or higher. A heavier (steel) tank would yield an even higher lifting index. Because of this, a single EMS worker attempting to lift and move such a cylinder faces a significant risk of back injury.

Cylinder storage compartments onboard EMS vehicles tend to be quite small, some barely larger than the cylinders themselves. These cramped spaces further compound the dangers faced by an EMS worker when changing out a cylinder. Because the spaces are small, only one worker can realistically fit within the compartment to manipulate the cylinder.

Some EMS vehicles feature horizontal storage compartments that require the cylinder to be installed either top or bottom first. Traditionally, the EMS worker must physically lift the cylinder from vertical storage and rotate it to a horizontal position without dropping it. This can be extremely difficult given the cylinder's weight, round shape, and lack of hand grips. Once horizontal, the cylinder must then be carefully slid into the compartment where it sits upon stowage rails or guides.

Potential back injury is not the only possible hazard associated with pressurized tanks. The cylindrical shape makes them difficult to grasp and awkward to handle by a single person. However, due to the cramped compartment in which they are stored, only one person can realistically be expected to handle the cylinders. Thus, a real danger exists that a pressurized cylinder being handled could fall from a vehicle unexpectedly. If the cylinder were to strike an object with the exposed valve, the cylinder might rupture. A ruptured cylinder can explode with tremendous force or even become a missile that can cause significant damage to anything it impacts.

Horizontally mounted cylinders also pose hazards to the worker's hands. Typically, the compartment on the ambulance will have rails with rollers or slides upon which the cylinder rests. To remove the cylinder, the EMS worker must grasp the cylinder near the supporting rollers and apply upward pressure to maintain sufficient friction to drag the bottle from the compartment. Often, injuries occur in this process due to the tank shifting and fingers becoming pinched between the tank and the rollers/slides.

Therefore, a need exists for a device that allows a vertically stored cylinder to be securely lifted, transported, and/or rotated horizontally such that it can be safely inserted into a horizontal storage compartment onboard an EMS vehicle. Further, a need exists for a safe and secure device that allows the cylinder to be inserted into and removed from the compartment either top first (valve end) or bottom first (foot end). Further, a need exists for such a device that positively supports and locks the cylinder in the horizontal position. Finally, a need exists for a device that allows a horizontally stored cylinder to be safely and easily gripped to allow an individual to move the cylinder. These needs and others are satisfied by the disclosed invention.

BRIEF SUMMARY OF THE INVENTION

In light of the difficulties faced with lifting and moving pressurized tanks, it is one object of the present invention to provide an apparatus that can safely and efficiently lift, support, and control a pressurized tank during transport.

It is yet another objective of the present invention to provide an apparatus that allows a mounted cylinder to be rotated to or from a horizontal position for removal from or insertion into an EMS stowage compartment.

It is yet another objective of the present invention to provide an apparatus that allows the cylinder to be inserted either top first or bottom first into an EMS stowage compartment.

It is yet another objective of the present invention to provide an apparatus that can be easily maneuvered by a single operator under all load conditions.

It is yet another objective of the present invention to provide an apparatus that is simple to operate.

It is yet another objective of the present invention to provide an apparatus that is compact in size to allow easy manipulation of tanks within the confines of ambulance stowage compartments.

It is yet another object of the present invention to provide an apparatus that allows an EMS worker to safely and securely grasp a horizontal cylinder for removal from or insertion to an EMS vehicle's stowage compartment.

In accordance with a preferred embodiment of the present invention, a battery-powered electric hoist is provided that incorporates a tank cradle for firmly and safely restraining a pressurized tank for transport. The hoist incorporates an electric linear actuator that can raise the tank to the desired height of an ambulance stowage compartment. The tank cradle features a locking mechanism that allows the cradle and cylinder to be rotated between the vertical and horizontal positions. Large swivel casters are also provided to allow for easy movement of the hoist and attached tank by a single operator. In addition, the tank cradle and base are compact in size to allow for easy maneuverability. This affords greater ease in inserting and removing a pressurized tank from the cramped stowage compartments of an ambulance.

An additional embodiment features a novel foot retraction mechanism that allows a cylinder, when mounted in the cradle in the horizontal position, to be slid horizontally from the cradle bottom first into an ambulance stowage compartment. A novel positive integrated locking mechanism is incorporated such that when the foot is retracted the tank cradle cannot be moved from the horizontal position. Other embodiments of the invention feature a fixed foot mechanism so that the cylinder can only be slid horizontally from the cradle top first into an ambulance stowage compartment.

The invention accordingly comprises the features described more fully below, and the scope of the invention will be indicated in the claims. Further objects of the present invention will become apparent in the following detailed description read in light of the drawings.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numerals refer to like parts throughout the views, wherein.

Figure 1:
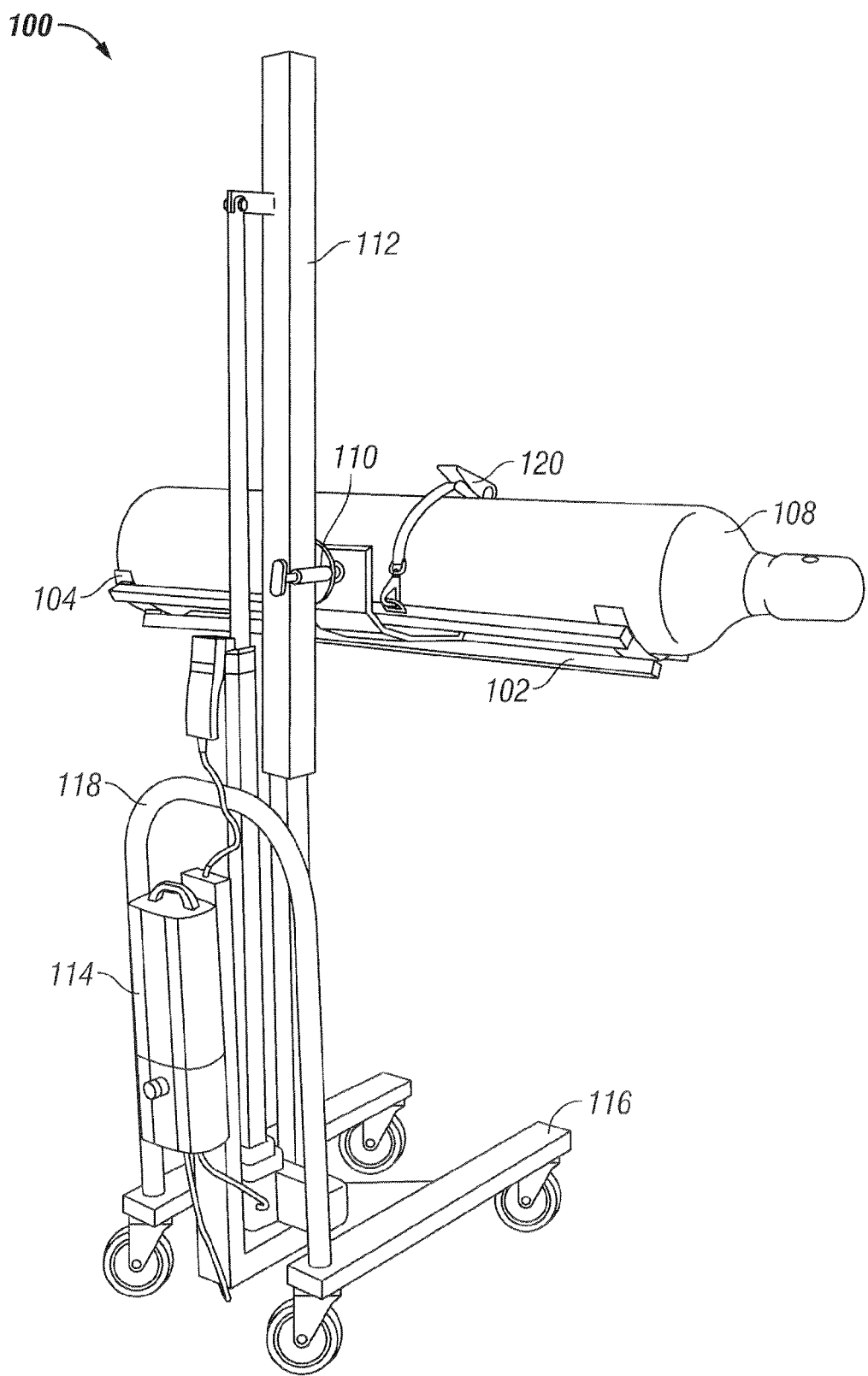
FIG. 1 is a perspective view of an embodiment of the present invention with a fixed foot and the tank cradle with cylinder raised and locked in the horizontal position for a top first insertion.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

FIG. 1 illustrates a hoist 100 according to one embodiment of the present invention with a cylinder 108 mounted in the tank cradle 102 and raised for transport. The cradle 102 features a fixed foot 104 and only allows the hoist 100 to be used in either a vertical or top first cylinder installation/removal situation. When the cylinder 108 is positioned for transport, an operator can grasp the handle 118 and easily move the hoist 100 into position. The rugged support base 116 features large casters for ease of movement of the hoist 100 with cylinder 108 over standard surfaces by a single operator.

Outside of an EMS vehicle, the cylinder 108 is typically stored standing vertically. An EMS worker or other individual seeking to replace a cylinder will position the hoist 100 such that the vertical tank cradle 102 is touching the cylinder 108. A ratchet strap or similar retention mechanism is then utilized to positively retain the cylinder 108 to the tank cradle 102 during transport. Once strapped into the tank cradle 102, the controller and power source 114 allows the linear actuator 112 to raise the tank cradle 102 to the desired height. Once raised, the tank cradle 102 can be rotated and locked in the horizontal position with the pivot mechanism 110.

The pivot mechanism 110 features stops that prevent the tank cradle 102 from rotating more than approximately 90 degrees from the vertical position such that the cylinder remains on top of the tank cradle 102 in the horizontal position. In another embodiment the tank cradle 102 is allowed to rotate slightly more than 90 degrees from the vertical position to allow gravity to assist the operator in removing the cylinder 108 from the tank cradle 102.

Figure 2:
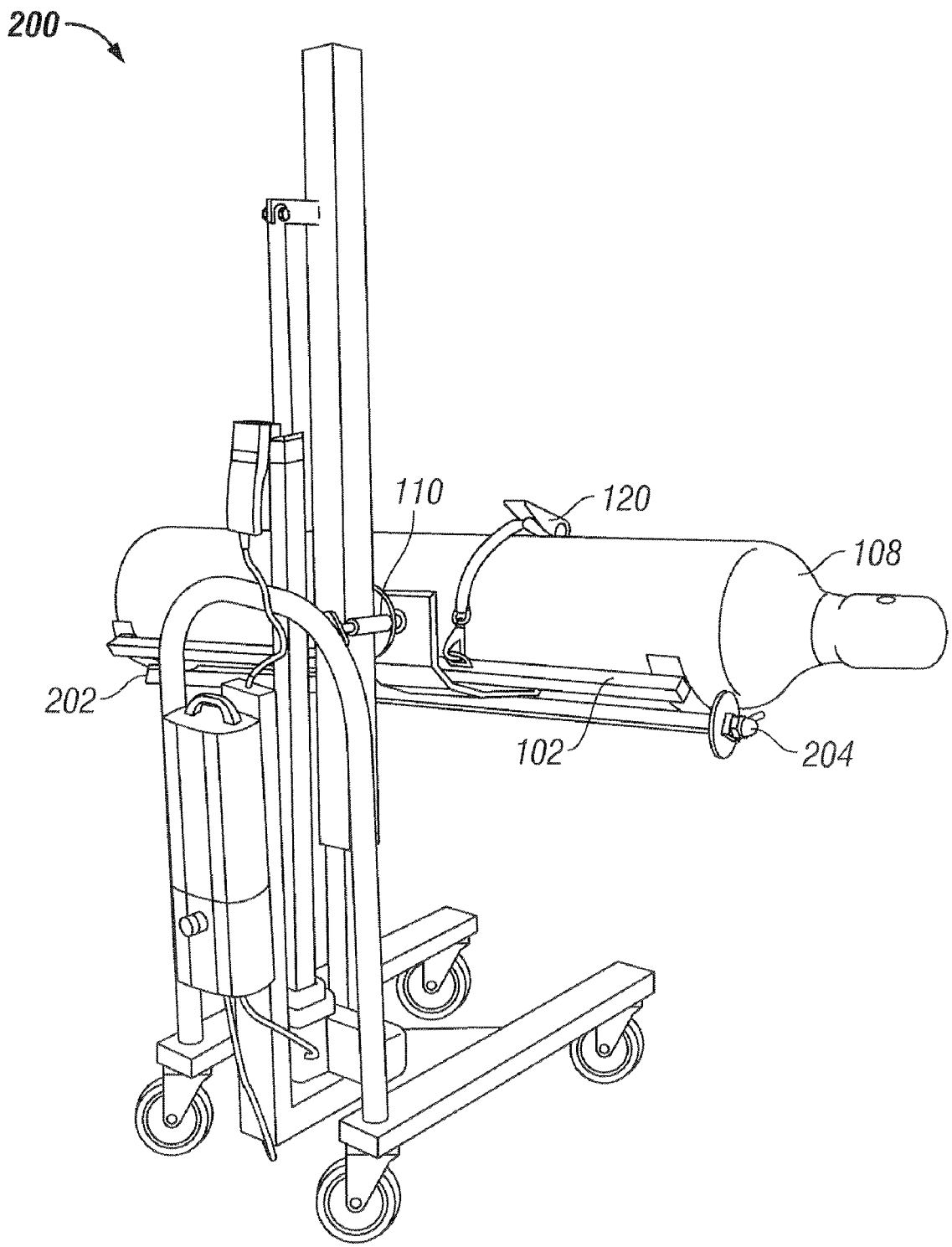
FIG. 2 is a perspective view of an embodiment of the present invention with a retractable foot mechanism and the cylinder raised and locked in the horizontal position for a bottom first insertion.

FIG. 2 illustrates a hoist 200 according to another embodiment of the present invention. In this embodiment, the tank cradle 102 features a retractable foot mechanism 202 and actuating handle 204. The actuating handle 204 is tied to the foot mechanism 202 via linkage that interacts with the pivot mechanism 110. In this embodiment, the handle 204 is rotated counterclockwise (when viewed from the handle 204 to the foot 202) to extend the foot 202. To retract the foot 202 requires approximately a quarter turn of the handle 204 in the clockwise direction. One skilled in the art will appreciate that the direction and amount that the handle 202 turns can vary without straying from the inventive concept.

Figure 3:
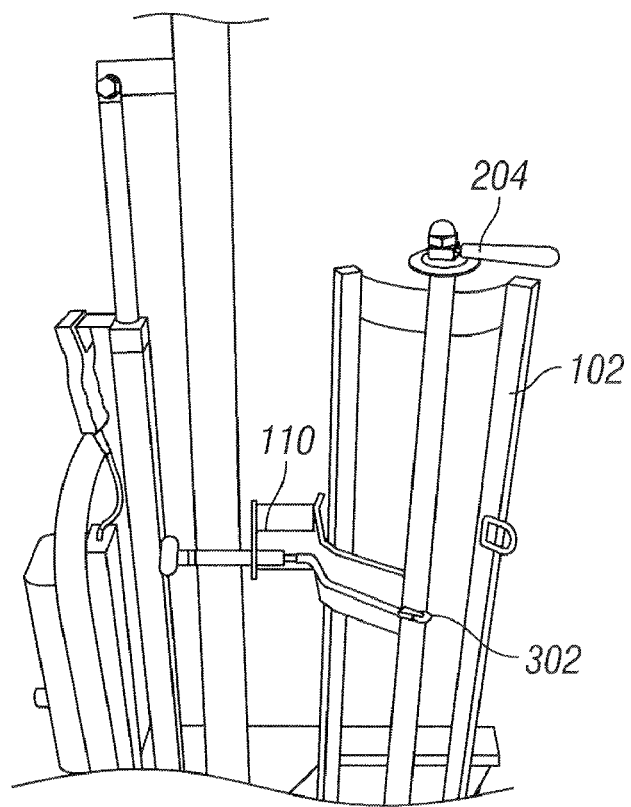
FIG. 3 is a close-up view of the retractable foot mechanism actuating handle in the extended position with the tank cradle locked in the vertical position.
Figure 4:
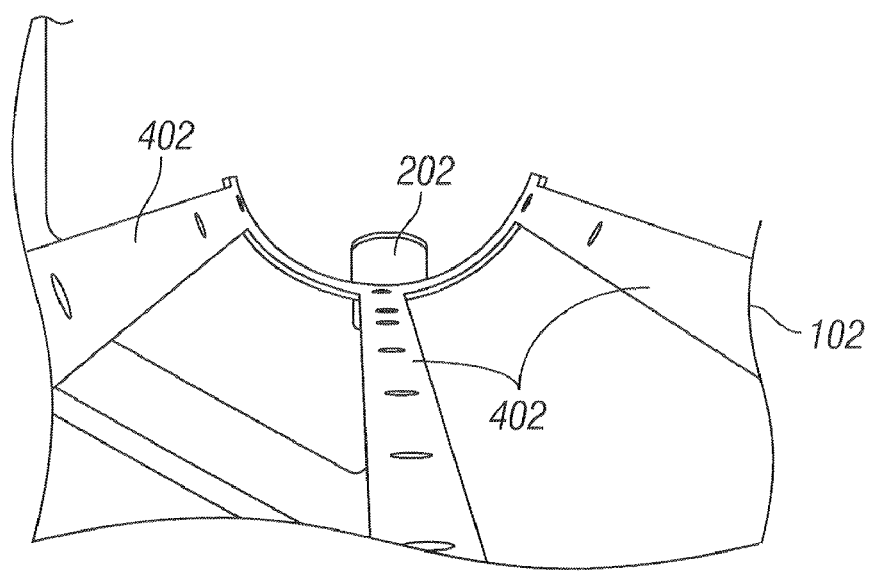
FIG. 4 is a close-up view of the retractable foot mechanism and tank cradle cylinder support surface.

FIG. 3 shows a close-up view of the linkage 302 as it interacts with the pivot mechanism 110. When the tank cradle 102 is in the vertical position, the linkage 302 does not allow the actuating handle 204 to be moved from the "foot mechanism extended" position. Thus, the foot 202 remains extended while the cradle 102 is vertical. If the foot 202 were retracted in this vertical position, the cylinder would likely slip from the tank cradle 102 and cause damage. FIG. 4 illustrates the foot mechanism 202 in the extended position.

Figure 5:
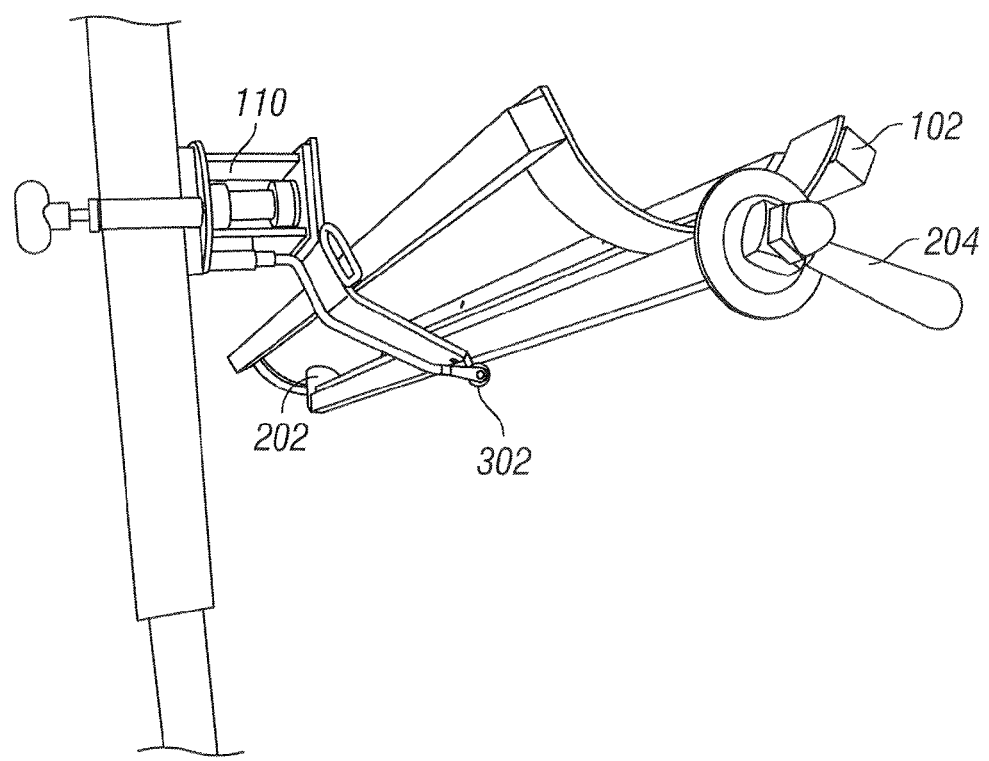
FIG. 5 is a close-up view of the retractable foot mechanism handle and linkage with the foot in the extended position on a tank cradle unlocked while in the horizontal position.
Figure 6:
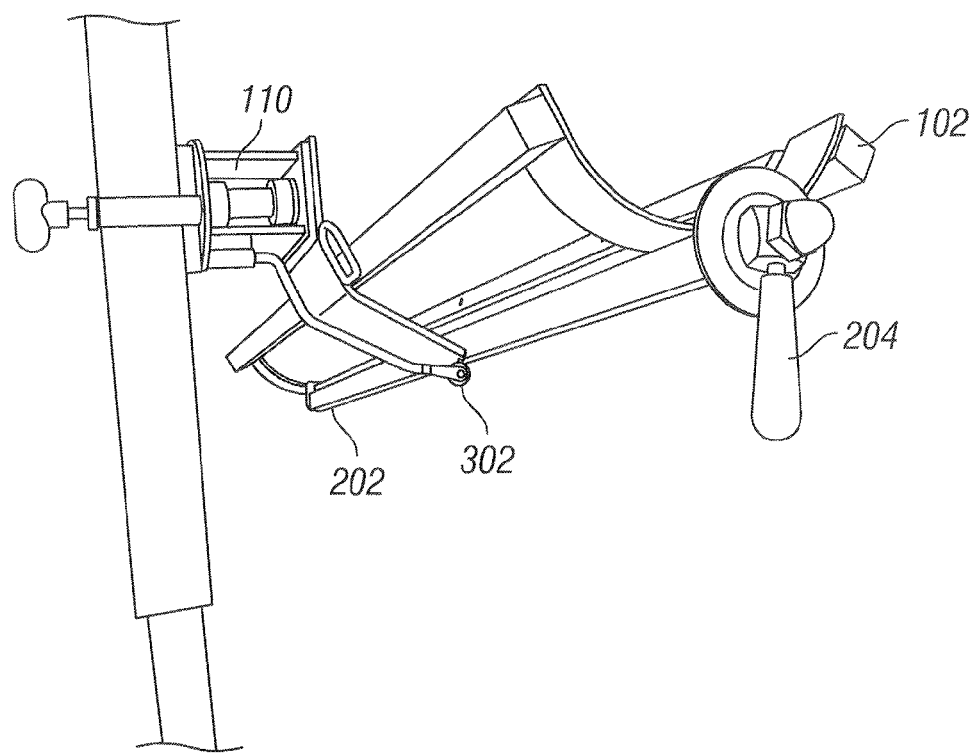
FIG. 6 is a close-up view of the retractable foot mechanism handle and linkage with the foot in the retracted position on a tank cradle positively locked in the horizontal position.

FIG. 3, FIG. 5, and FIG. 6 each illustrate the pivot mechanism 110 in greater detail. The mechanism 110 has two brackets. One bracket is affixed to the linear actuator 112 and the other is affixed to the tank cradle 102. A central support shaft connects the two brackets and allows the cradle side to rotate on bearings independently of the actuator side. In another embodiment the central support shaft utilizes bushings in place of bearings.

FIG. 5 and FIG. 6 depict the linkage 302 and its interaction with the pivot mechanism 110. FIG. 6 shows the mechanism with the tank cradle 102 in the horizontal position and the foot 202 retracted. The linkage 302 engages a hole in the pivot mechanism 110 to positively lock the cradle 102 in the horizontal position. When the foot 202 is extended as in FIG. 5, the linkage 302 disengages the hole in the pivot mechanism 110 and the cradle 102 is allowed to rotate to vertical. When the cradle 102 is vertical, as shown in FIG. 3, the linkage 302 is blocked from movement by the spring loaded locking pin. This creates a positive means for locking the foot retraction mechanism handle 204 in the extended position and thus prevents a mounted cylinder from slipping off of the bottom of the tank cradle 102.

The pivot mechanism 110 further comprises perforations through which the linkage 302 can pass to physically lock the two sides of the mechanism 110. The spring-loaded locking pin with handle utilizes its own perforations. This spring-loaded locking pin allows the operator to lock the cradle in either the horizontal or vertical position.

The major structural components of the hoist (100 and 200) are constructed from steel. Steel is preferable because is inexpensive, easy to fabricate, structurally stable, and readily available. However, a person having ordinary skill in the art of fabrication would realize that other metals such as aluminum or even materials such as polymer composites may be used depending upon the structural load requirements. Lighter materials may make the hoist (100 and 200) easier to maneuver due to the lighter weight. However, the tradeoff may be in increased cost and reduced stability of a fully-loaded device. Steel provides a good balance of manufacturability, cost, stability, and maneuverability.

With reference to FIG. 1 and FIG. 2, the hoist (100 and 200) features a support base 116 with swivel casters for maneuverability. The base 116 is fabricated such that there is a center opening between two outer rails. The center opening is just wide enough to allow for a pressurized cylinder to fit between the rails for attachment to the tank cradle 102.

With reference to FIG. 1 and FIG. 2, the hoist (100 and 200) features a tank cradle 102 that is shaped to wrap partially around a pressurized tank for support. The radius of the curve of the cradle 102 approximates the radius of the body section of the pressurized tank. The cradle 102 also extends vertically to the approximate height of the body portion of a full-sized pressurized tank. Thus, because its height is suitable for the tallest tank, the cradle 102 can support essentially any sized pressurized tank. One skilled in the art will recognize that the length of the tank cradle can be tailored to the desired application without straying from the inventive concept.

With reference to FIG. 4, the cradle 102 features support rails 402 for the cylinder. The supports 402 in one embodiment comprise polymer strips (such as polytetrafluoroethylene which is sold under the trademark TEFLON). The polymer strips reduce the coefficient of friction between the cradle 102 and cylinder 108 and allow the cylinder 108 to be easily slid to or from an EMS vehicle's storage compartment on the cradle 102. Other surface materials, such as natural fibers or metal, can be utilized as well so long as they serve to reduce friction and aid in cylinder 108 movement. Other embodiments may utilize metal or plastic rollers to reduce friction and aid in cylinder 108 movement.

Figure 7:
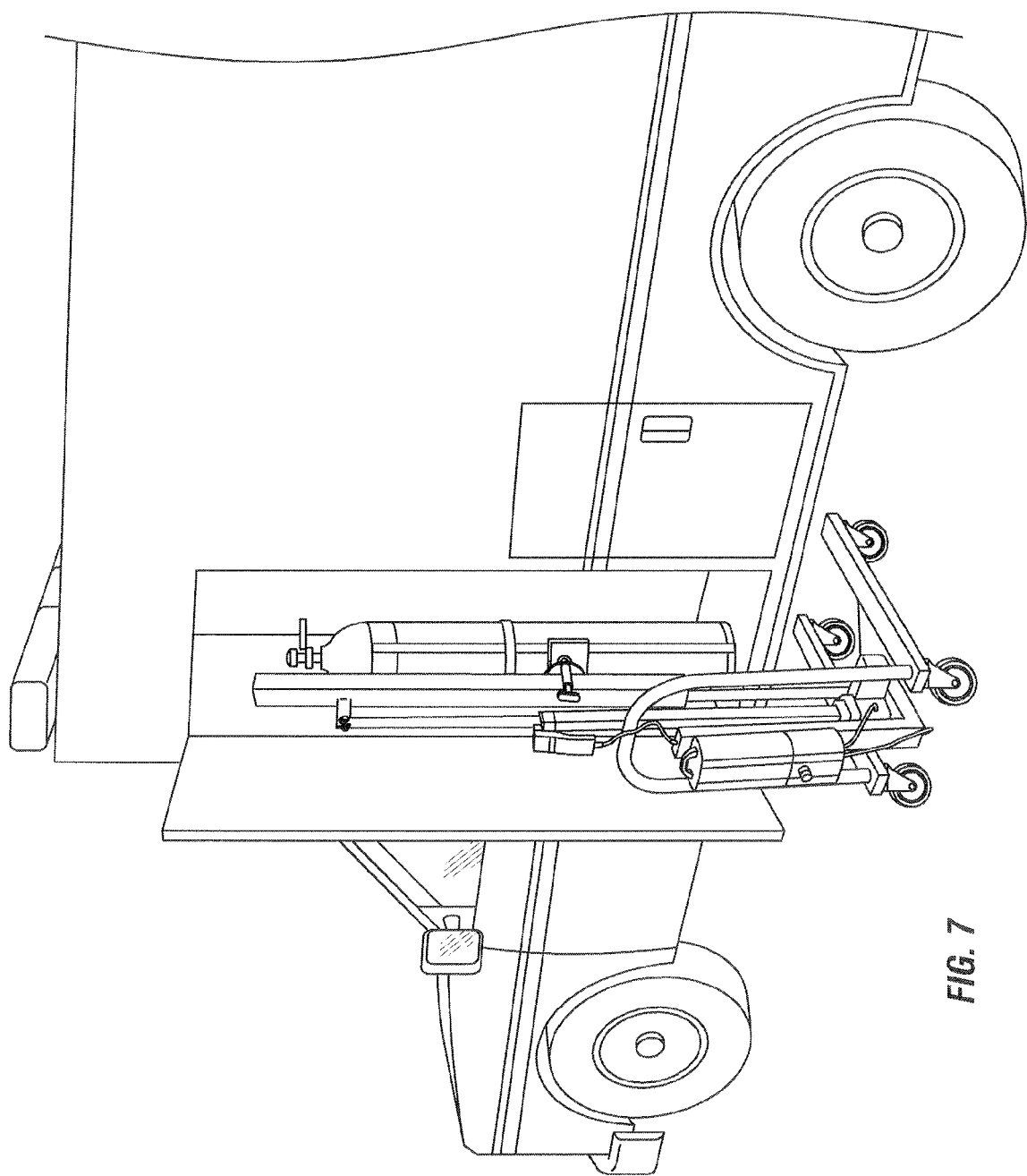
FIG. 7 is a perspective view of an embodiment of the present invention as it is used to insert a cylinder or remove it from a vertical stowage compartment onboard an EMS vehicle.

FIG. 7 depicts an ambulance with a vertical stowage compartment. In this illustration, the present invention is being used to either install a cylinder to or remove a cylinder from the vertical compartment. If removing the cylinder, the hoist is positioned next to the compartment and the tank cradle is raised to the proper height. The cradle can then be inserted into the compartment and the cylinder strapped to the cradle. By slightly raising the cradle further, the cylinder, which rests upon the foot of the cradle, is raised clear of the compartment floor. The hoist can then be pulled from the compartment and the cylinder extracted for replacement. To insert a cylinder into the stowage compartment merely requires reversal of the steps for removal.

Figure 8:
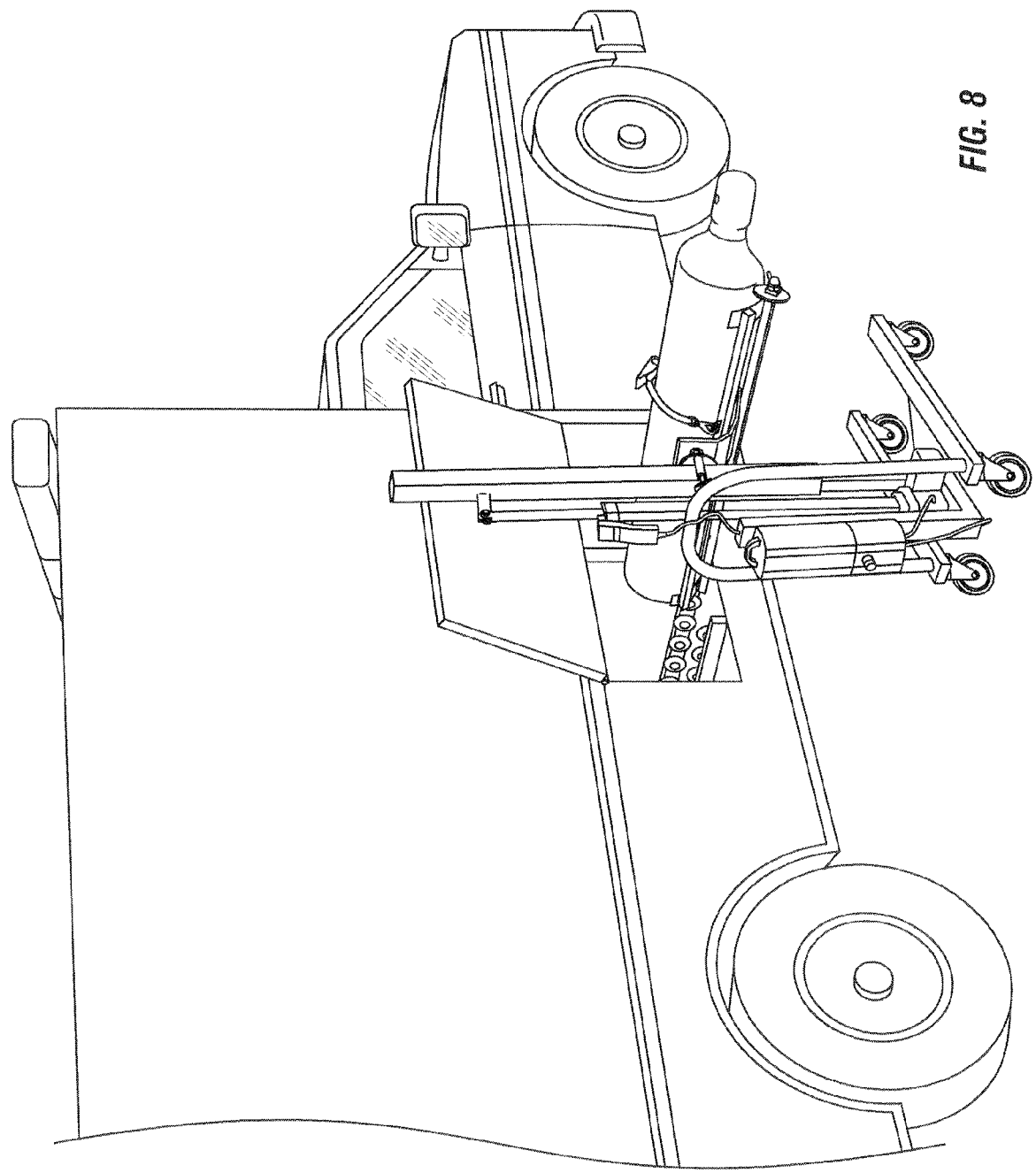
FIG. 8 is a perspective view of an embodiment of the present invention as used in a foot first stowage situation in an EMS vehicle with a horizontal compartment.

FIG. 8 depicts an ambulance with a horizontal stowage compartment requiring a bottom first insertion. Once the cylinder is resting on the cradle foot and is strapped to the vertical tank cradle, it can be raised clear of the floor. The cradle can then be rotated approximately 90 degrees from vertical and the cylinder height positioned such that it aligns with the horizontal compartment. Once the hoist is positioned next to the compartment, the cradle foot can be retracted. Once retracted, the foot retraction mechanism linkage positively locks the cradle in this horizontal position. With the foot retracted, the cylinder retention strap can be removed and the cylinder can then be slid from the cradle bottom first into the compartment. Removal of a horizontally mounted tank merely requires reversal of the steps for insertion.

Figure 9:
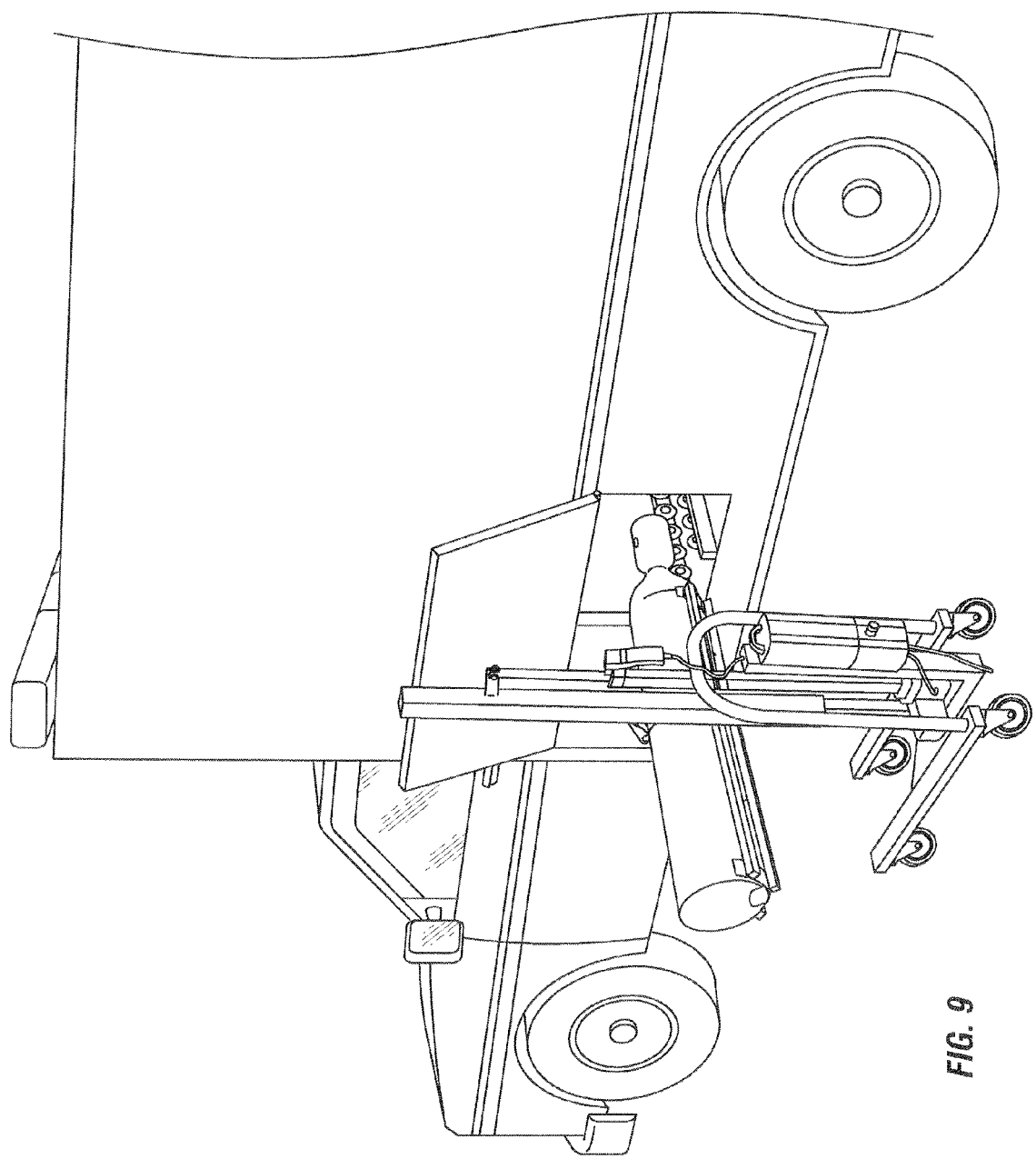
FIG. 9 is a perspective view of an embodiment of the present invention as used in a top first stowage situation in an EMS vehicle with a horizontal compartment.

FIG. 9 depicts an ambulance with a horizontal stowage compartment requiring a top first insertion. As with the previous steps, once the cylinder is resting on the cradle foot and is strapped to the vertical tank cradle, it can be raised clear of the floor. The cradle can then be rotated approximately 90 degrees from vertical and the cylinder height positioned such that it aligns with the horizontal compartment. Once the hoist is positioned next to the compartment, the cylinder retention strap can be removed and the cylinder can then be slid from the cradle top first into the compartment. Removal of a horizontally mounted tank merely requires reversal of the steps for insertion.

Figure 10:
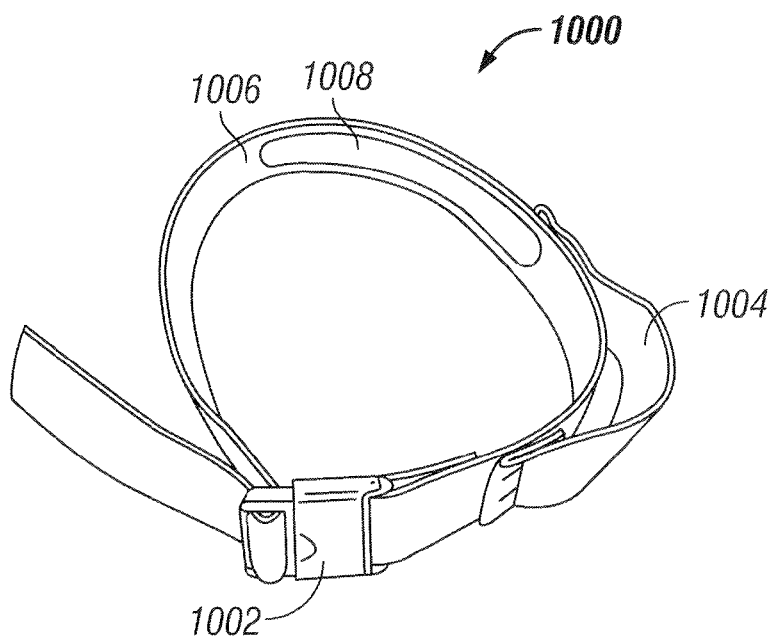
FIG. 10 is a detailed view of an embodiment of the tank gripping device for safely gripping and positioning a horizontal tank.

FIG. 10 illustrates a tank gripping device 1000 that facilitates safe movement of a horizontal cylinder. This device 1000 comprises flexible material 1006, a locking adjustable buckle 1002, and an integral handle 1004. The flexible material in the present embodiment is nylon strap that is of sufficient size and strength to support a substantial portion of the weight of a full cylinder. Other materials such as polypropylene, polyester, leather or canvas strap may also be used for the strap 1006.

Another embodiment of the device 1000 comprises a rubberized coating 1008 on the inner surface of the device material. This rubberized coating improves the devices grip strength on a cylinder. This prevents the strap from slipping on the cylinder's outer surface as force is applied to move the cylinder.

The device 1000 also features a buckle 1002 that is self locking with a single pull adjustment. However, the same effect can be achieved through the use of a cam buckle, rectangular ring, circular ring, slider, glide, or ladderloc buckle. In addition, the buckle 1002 can be either metal or plastic so long as it too is sufficiently strong to withstand a substantial portion of the weight of a full cylinder.

The device 1000 features an integral handle 1004 that provides a means for the EMS worker to safely and confidently grip and move a cylinder. This handle 1004 is typically made from the same material as the strap 1006. However, the handle can be different. For instances, the handle 1004 could be made from nylon strap encased with glove leather for a more comfortable grip.

The handle 1004 comprises a length of material that is attached to the outer surface of the device 1000. The means of attachment is dictated by the materials chosen. For example, the present embodiment is made from nylon strap, which allows the handle 1004 to be sewn directly to the device's outer surface. Other materials, such as natural or synthetic leather, may be sewn or attached using buckles. The attachment means used should be capable of withstanding a substantial portion of the weight of a full cylinder.

Figure 11:
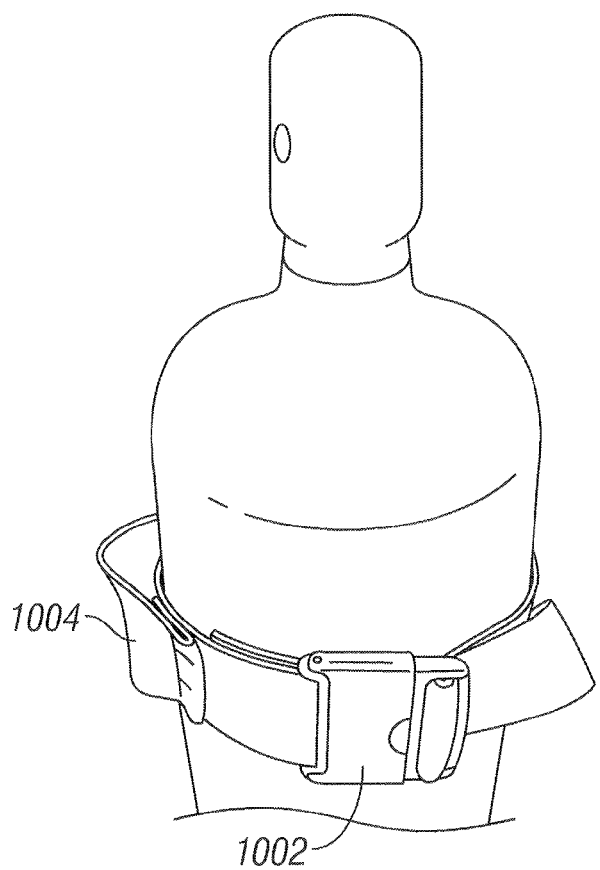
FIG. 11 is a drawing of the tank gripping mechanism as it is attached to a cylinder.

FIG. 11 depicts a tank gripping device 1000 as it is attached to a cylinder. The adjustment on the device 1000 is loosened and the device is wrapped around the perimeter of the cylinder. Once buckled, the device is tightened. This provides an EMS worker with a handle for securely gripping a cylinder for positioning.

Figure 12:
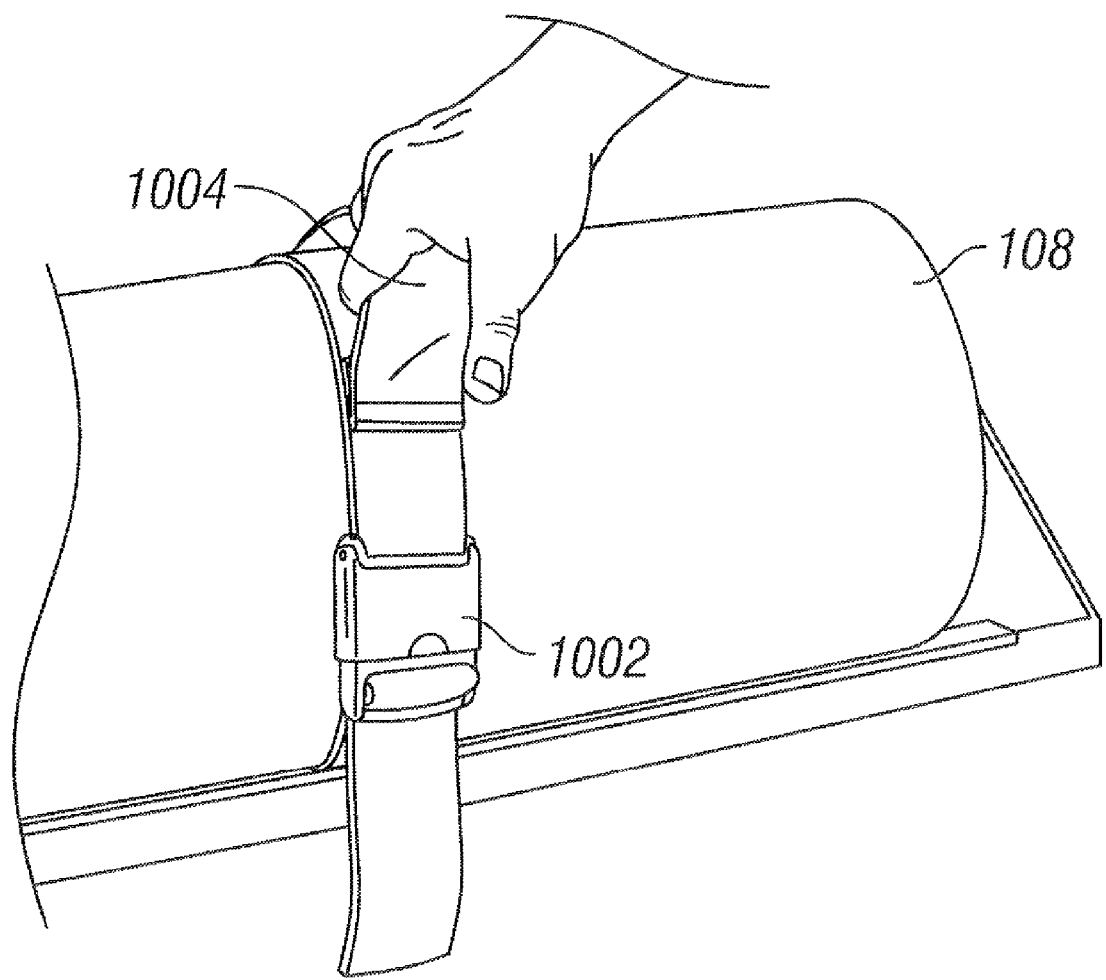
FIG. 12 is a drawing depicting the proper use of the tank gripping device to position a horizontal cylinder.

FIG. 12 depicts a cylinder 108 as it appears in a horizontal stowage compartment. The cylinder 108 rests on rails or rollers within the compartment. An EMS worker seeking to move the cylinder 108 opens the device's buckle 1002 and wraps it around the perimeter of an accessible portion of the cylinder 108. This may require lifting the cylinder 108 slightly upward in order to get the strap 1006 between the cylinder and the rails upon which it rests. Once the device 1000 is in place, the buckle 1002 can be closed and the strap tightened to securely grip the cylinder 108. The EMS worker can then grasp the handle 1004 and safely pull the cylinder 108 from the compartment without concern for pinched fingers.

In view of the foregoing, the hoist serves special needs required by the EMS community. In particular, the hoist allows a single operator to safely and efficiently lift and transport a pressurized tank without the risk of back injury. The compact features of the hoist lend to the device's maneuverability and ease of operation. Thus, a single operator can effectively remove a pressurized tank from an ambulance compartment and install a new one without assistance.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A device for lifting and transporting a pressurized cylinder, the device comprising:
    a base;
    a cradle having a foot to support the cylinder when disposed within the cradle, the foot movable between an extended position and a retracted position;
    a linear actuator mounted to the base and supporting the cradle for vertical positioning of the cradle relative to the base;
    a pivot mechanism rotatably joining the cradle to the actuator, the pivot mechanism positioning the cradle between a vertical position and a horizontal position; and
    a linkage interfaced to the pivot mechanism, the linkage automatically locking the foot in the extended position when the pivot mechanism positions cradle is in the vertical position, the linkage automatically unlocking the foot when the pivot mechanism positions the cradle is in the horizontal position to enable the foot to be rotatably positioned from the extended position to the retracted position;
    wherein the foot is attached to the lowest portion of the cradle and supports the weight of the cylinder while in the extended position, and when in the retracted position, enables the cylinder to slide from the cradle, bottom first, when the cradle is horizontal.

2. The device of claim 1 wherein the cradle further comprises a friction reducing surface chosen from the group consisting of polymer, natural fiber, and metal.

3. The device of claim 1 wherein the pivot mechanism allows the cradle to rotate approximately 90 degrees between the vertical and horizontal positions.

4. The device of claim 1 wherein the pivot mechanism comprises: a first bracket; a second bracket; and a supporting shaft, wherein the supporting shaft attaches the first bracket to the second bracket, and wherein the first bracket rotates with respect to the second bracket.

5. The device of claim 4 wherein the pivot mechanism further comprises: a locking pin, wherein the locking pin engages the first and second bracket to prevent rotation.

6. The device of claim 5 wherein the locking pin is spring-loaded such that manual force is required to disengage the first and second bracket.

7. The device of claim 1 wherein the foot is operable only when the cradle is approximately horizontal.

8. The device of claim 1 wherein the cradle can rotate only when the foot is extended.

9. A method, the method for using the device of claim 1 to insert a cylinder into a horizontal stowage compartment on an EMS vehicle in a bottom first fashion, the stowage compartment having mounts upon which the cylinder is to sit, the method comprising the following steps: (a) fastening the cylinder to the vertical cradle with the foot extended; (b) raising the cradle high enough such that the foot of the cradle is above the base; (c) rotating and locking the cradle approximately 90 degrees to the horizontal; (d) positioning the device parallel to the compartment such that the bottom of the cylinder is aligned with the rails and the device is as close to the vehicle as possible; (e) retracting the foot; (f) unfastening the cylinder from the cradle; and (e) sliding the cylinder from the cradle and into the compartment such that the cylinder's valve is the last portion to enter the compartment.

10. The device of claim 1, wherein the cradle is arcuate in shape approximating a radius of the cylinder.

11. The device of claim 1, further comprising a rotatable handle to extend and retract the foot.

* * * * *